US010767731B2

(12) United States Patent
Simula et al.

(10) Patent No.: US 10,767,731 B2
(45) Date of Patent: Sep. 8, 2020

(54) POWER CONVERTING DEVICE FROM TIMBER DRIVE ROLLERS TO AN ATTACHED IMPLEMENT

(71) Applicant: GSE TECHNOLOGIES, LLC, Houghton, MI (US)

(72) Inventors: Glen Raymond Simula, Hancock, MI (US); David Jon McKinstry, Calumet, MI (US)

(73) Assignee: GSE TECHNOLOGIES, LLC, Houghton, MI (US)

( * ) Notice: Subject to any disclaimer, the term of this patent is extended or adjusted under 35 U.S.C. 154(b) by 1012 days.

(21) Appl. No.: 15/182,772

(22) Filed: Jun. 15, 2016

(65) Prior Publication Data
US 2016/0298729 A1 Oct. 13, 2016

Related U.S. Application Data

(63) Continuation-in-part of application No. 15/042,583, filed on Feb. 12, 2016, now Pat. No. 10,504,103, which is a continuation-in-part of application No. 13/897,742, filed on May 20, 2013, now Pat. No. 9,260,277.

(51) Int. Cl.
*F16H 1/22* (2006.01)
*F16H 1/00* (2006.01)
*F16H 1/20* (2006.01)

(52) U.S. Cl.
CPC ............. *F16H 1/22* (2013.01); *F16H 1/003* (2013.01); *F16H 1/206* (2013.01)

(58) Field of Classification Search
CPC ......... F16H 1/22; A01G 23/00; A01G 23/095; A01G 23/099

USPC ................ 74/410, 665 B, 665 GA
See application file for complete search history.

(56) References Cited

U.S. PATENT DOCUMENTS

| 1,151,762 A | * | 8/1915 | Day | F16H 1/22 |
| | | | | 74/410 |
| 2,450,718 A | | 10/1948 | Darnell | |
| 2,671,880 A | | 3/1954 | Symonds | |
| 2,929,494 A | | 3/1960 | Lombardi | |
| 3,390,585 A | * | 7/1968 | Henne | B24B 31/02 |
| | | | | 74/410 |
| 3,985,047 A | | 10/1976 | Therkelsen | |

(Continued)

FOREIGN PATENT DOCUMENTS

| AU | 2010202945 A1 | 7/2010 |
| JP | 62-75151 * | 4/1987 |

(Continued)

OTHER PUBLICATIONS

International Search Report and Written Opinion; International Application Serial No. PCT/US2017/017284; dated May 1, 2017.

(Continued)

*Primary Examiner* — William C Joyce
(74) *Attorney, Agent, or Firm* — Brooks Kushman P.C.

(57) ABSTRACT

A transmission device 10 coupled to a processor energy source 12 having one or more processor driving rollers 14. The processor 12 provides energy to the transmission device 10. Multiple driven winch drive rollers 32 are supported by the body 18. A vertically-oriented propeller shaft 36 coupled with an implement such as a chipper are attached to the body 18.

11 Claims, 2 Drawing Sheets

(56) References Cited

U.S. PATENT DOCUMENTS

| | | | |
|---|---|---|---|
| 4,426,064 A | 1/1984 | Healy | |
| 4,854,547 A | 8/1989 | Oliphant | |
| 5,245,769 A | 9/1993 | Wammock | |
| 5,344,230 A * | 9/1994 | Kowalczyk | B01F 15/00435 |
| | | | 74/410 |
| 5,386,970 A | 2/1995 | Trant | |
| 5,507,471 A | 4/1996 | Mercurio | |
| 5,607,143 A | 3/1997 | Regal | |
| 5,946,970 A | 9/1999 | Fraley et al. | |
| 6,241,215 B1 | 6/2001 | Gersemsky et al. | |
| 6,422,538 B1 | 7/2002 | Rumfield | |
| 6,474,377 B1 | 11/2002 | Van De Mortel | |
| 6,705,597 B1 | 3/2004 | Reilly et al. | |
| 6,960,107 B1 | 11/2005 | Schaub et al. | |
| 7,478,795 B2 | 1/2009 | Grapes et al. | |
| 7,909,308 B2 | 3/2011 | Lauder et al. | |
| 2003/0015052 A1 * | 1/2003 | Hulshof | F16H 1/22 |
| | | | 74/410 |
| 2006/0169961 A1 | 8/2006 | Ledford | |
| 2007/0194290 A1 | 8/2007 | Fofonoff et al. | |
| 2009/0308826 A1 | 12/2009 | Kempf | |
| 2010/0051890 A1 | 3/2010 | Lauder et al. | |
| 2011/0079760 A1 | 4/2011 | Kempf | |
| 2014/0341696 A1 | 11/2014 | Simula et al. | |
| 2016/0159623 A1 | 6/2016 | Simula et al. | |

FOREIGN PATENT DOCUMENTS

| | | |
|---|---|---|
| JP | 7232899 A | 9/1995 |
| WO | 2014189606 A1 | 11/2014 |
| WO | 2015193809 | 12/2015 |

OTHER PUBLICATIONS

International Preliminary Report on Patentability; related International application No. PCT/US2014/031205; dated Nov. 24, 2015.

International Search Report and Written Opinion; International application No. PCT/US2014/031205; dated Jul. 21, 2014.

EP Supplemental Search Report dated Jan. 27, 2017, EP Appn. No. 14800534.1, 11 pgs.

International Search Report and Written Opinion; related International application No. PCT/US2014/031205; dated Jul. 21, 2014.

International Preliminary Report on Patentability; related International application No. PCT/2014/031205; dated Nov. 24, 2015.

* cited by examiner

POWER CONVERTING DEVICE FROM TIMBER DRIVE ROLLERS TO AN ATTACHED IMPLEMENT

CROSS REFERENCE TO RELATED APPLICATION

This application is a continuation in part of U.S. Ser. No. 15/042,582 filed on Feb. 12, 2016, now U.S. Pat. No. 10,118,807 issued Nov. 6, 2018 and U.S. Ser. No. 13/897,742 filed on May 20, 2013, now U.S. Pat. No. 9,260,277 issued Feb. 16, 2016, the disclosures of which are incorporated in their entirety by reference herein.

TECHNICAL FIELD

Background (1) Field of the Invention

The present disclosure relates to a device that converts power from drive rollers to an attached implement, usually in a forestry environment.

(2) Related Art

Particularly in the lumber business, it is known that there are challenges imposed by remote locations, hard-to-reach job sites, the size and weight of trees to be felled and the movement after felling of heavy, unstable trees and limbs. To meet such challenges, machinery has been developed that deploy tree and limb processors. Examples include equipment made by Waratah, such as the HTH625C harvester head—http://www.waratah.net.

The following patent numbers were considered before filing this patent application: JP 7232899; AU 2010/202945; U.S. Pat. Nos. 6,705,597; and 5,386,970.

SUMMARY

One embodiment of the present disclosure includes a transmission device by which the disclosed method is practiced. The transmission device is coupled to a timber processor energy source having a plurality of processor driving rollers. Thus, the processor energy source provides energy to an attached implement through the transmission device.

In more detail, the transmission device is a body having a front face, a back face, lateral side faces, a top, a bottom, an imaginary horizontal axis extending between the lateral side faces, and an imaginary vertical axis extending between the top and the bottom. The body is detachably attachable to the processor energy source;

Two pairs of driven rollers are driven by the processor driving rollers. Those driven rollers are supported between the top and the bottom of the body so that they are rotatable about axes that are parallel to the vertical axis in response to the processor driving rollers.

A reverse gear intermeshes with each pair of driven rollers. Each reverse gear transfers rotational energy from the driven rollers. An idler roller cooperates with one of the reverse gears.

A propeller shaft and associated propeller shaft gear rotate in unison with the idler roller and one of the reverse gears. The shaft delivers rotational energy to the attached implement.

One way of operating the disclosed apparatus involves these steps, not all of which need to be practiced, nor in the sequence set forth:

A. lowering the processor and the pair of driving rollers over the transmission device;

B. engaging the processor driving rollers with the driven rollers so that in one embodiment each processor driving roller engages two driven rollers;

C. attaching an implement such as but not limited to a chipper to a propeller shaft that energizes the implement; and D. rotating the processor driving rollers and the driven rollers to turn the propeller shaft and thus activate the implement.

DETAILED DESCRIPTION

Figure 1:
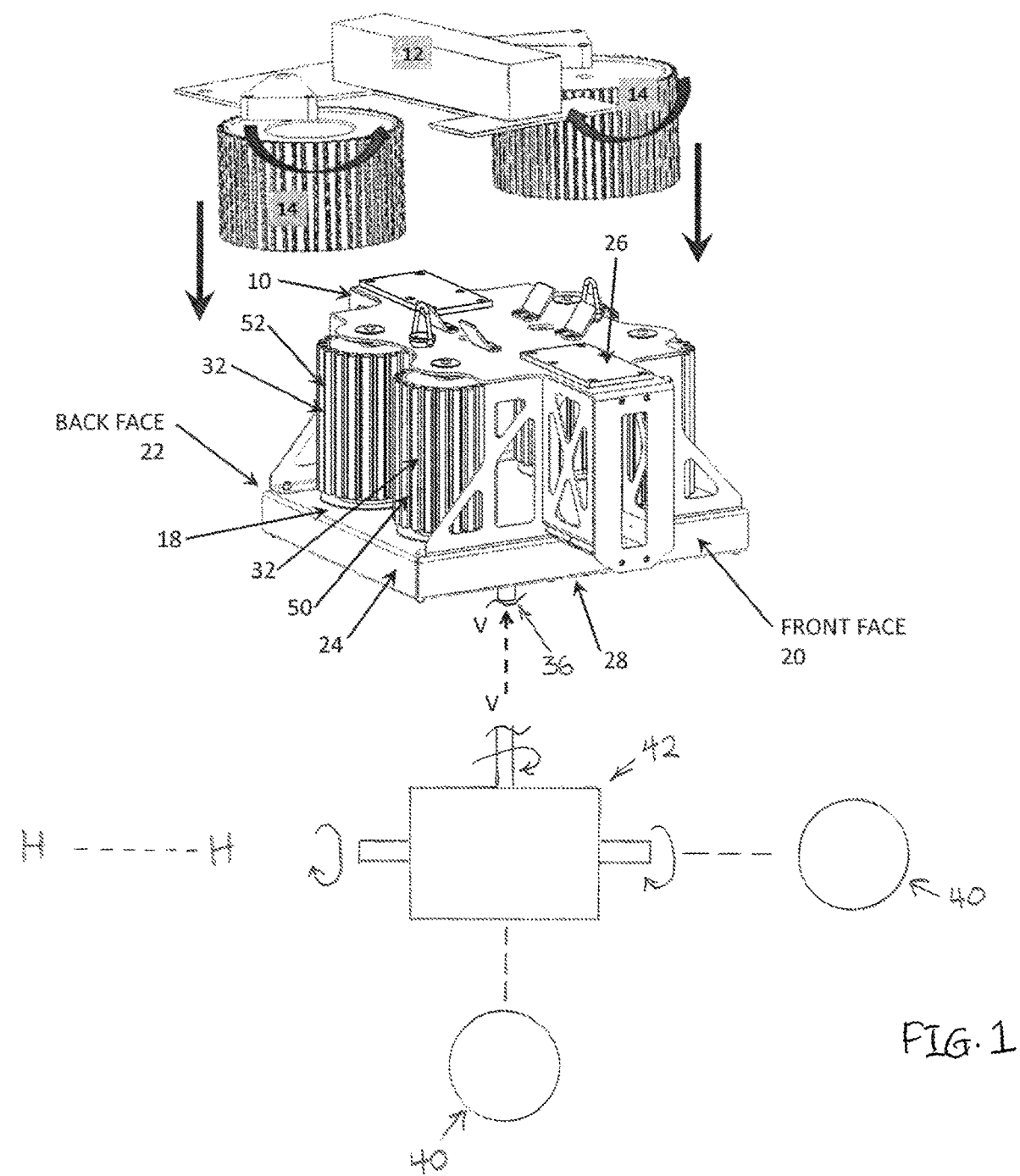
FIG. 1 is a quartering perspective view of a transmission device as disclosed herein.
Figure 2:
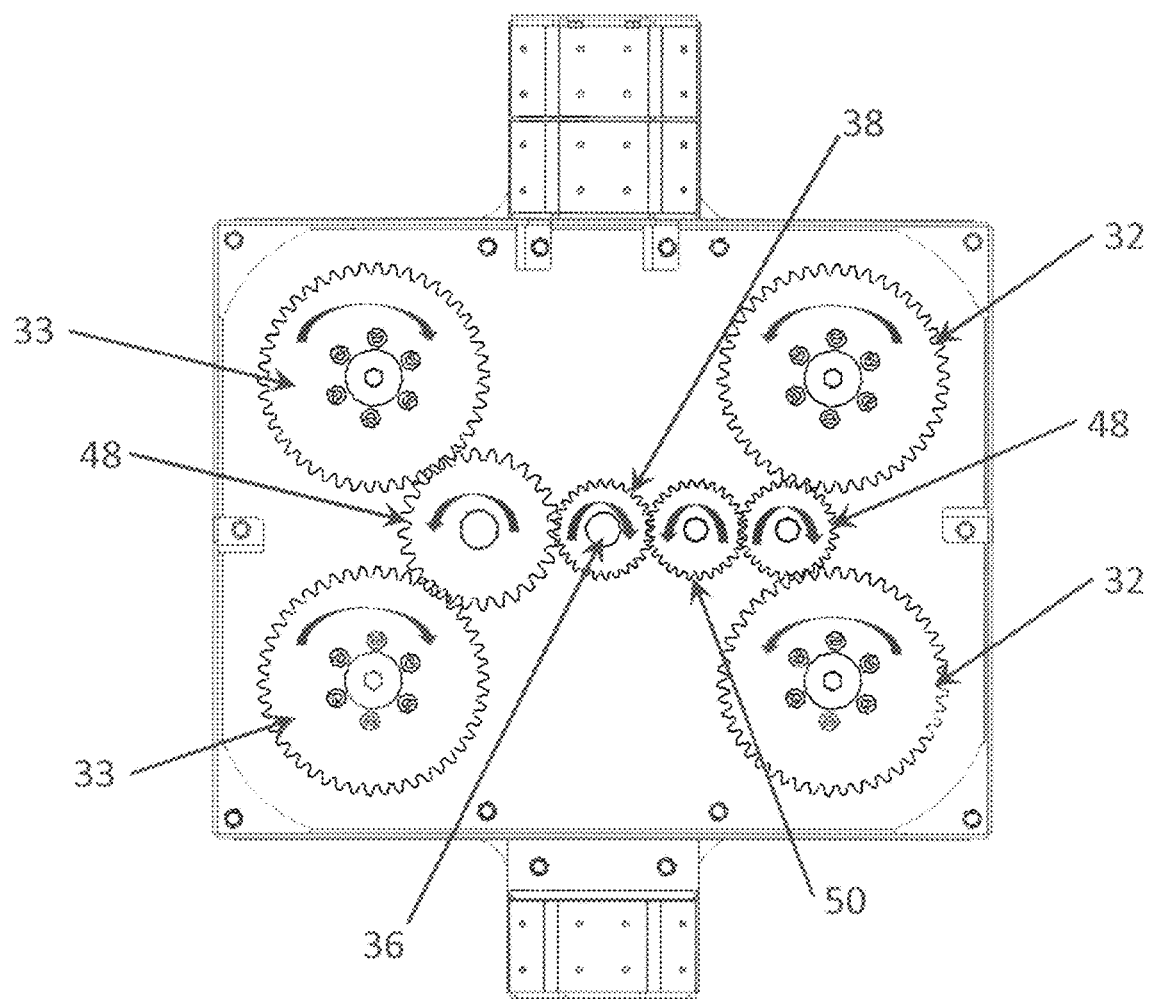
FIG. 2 is a horizontal sectional view of the system shown in FIG. 1.

Referring to FIGS. 1-2, a transmission device 10 is coupled to a timber processor energy source 12 having a plurality of processor driving rollers 14. The processor energy source 12 provides energy to an attached implement 40 through the transmission device 10. The transmission device has a body 18 having a front face 20, a back face 22, lateral side faces 24, a top 26, a bottom 28, an imaginary horizontal axis extending between the lateral side faces 24, and an imaginary vertical axis V-V extending between the top and the bottom. In use, the body 18 is detachably attachable to the processor energy source 12.

Two pairs of driven rollers 32, 33 are accommodated in the transmission device 10. Each pair 32, 33 is driven by one of the processor driving rollers 14. The driven rollers 32, 33 are supported between the top 26 and the bottom 28 of the body 10 so that they are rotatable about axes that are parallel to the vertical axis V-V in response to the processor driving rollers 14.

A reverse gear 48 lies in communication with each pair of driven rollers 32, 33. Each reverse gear 48 transfers rotational energy from the driven rollers 32, 33.

As shown in FIG. 2, an idler roller 50 intermeshes with one of the reverse gears 48.

A propeller shaft 36 and associated propeller shaft gear 38 rotate in unison with the idler roller 50 and one of the reverse gears 48. The propeller shaft 36 extends between the top 26, and bottom 28 faces and has an axis of rotation that is parallel to the vertical axis V-V. The shaft 36 delivers rotational energy to the attached implement 40.

It will be appreciated that the term "horizontal" should not be strictly construed. In practice, this term suggests a frame of reference in relation to the body 18 of the transmission device 10. It may be that the environment of use may be inclined to a truly horizontal plane. Similarly for the term "vertical". It also should not be strictly construed, except that the vertical axis should be considered orthogonal to the horizontal axis.

In one embodiment, the processor driving rollers 14 of the processor energy source 12 includes two processor driving rollers 14. Preferably, the one or more driven rollers 32, 33 comprise four rollers. In alternate embodiments there may be more processor driving rollers 14 and driven rollers 32, 33.

Where there are four driven rollers, two rollers are mounted adjacent the front face 20 of the transmission device 10 and two rollers 52 are mounted adjacent the back face 22 of the transmission device 10. In such a case, the reverse gear 48 preferably intermeshes between the front two 50 transmission device gears.

In use, the disclosed system comprises in combination a transmission device 10, as described above and a processor energy source 12 to which the transmission device 10 is coupled.

In use, one method for operating the transmission device 10 involves the processor 12 descending from above and engaging the transmission device 10. After engagement, the transmission device 10 is coupled to the movable processor 12.

One embodiment of the processor 12 has a pair of processor driving rollers 14. Via a gearing system, the processor 12 provides rotational, translational and potential energy to the transmission device 10. The gearing system rotates, stops or reverses the rotation of the propeller shaft 36.

Preferably, the two pairs of driven rollers comprise a first pair 32 that rotate in a clockwise direction and a second pair 33 that rotate in a counter clockwise direction.

The reverse gears 48 are mounted so that they rotate with two of the driven rollers 32,33 in a plane that lies perpendicular to the vertical axis V-V. It will be understood that the reverse gears 48 intermesh between rollers in each pair 32, 33 of driven rollers.

Optionally the propeller shaft 36 extends from the body 10 along an axis that lies in parallel with the vertical axis V-V below the bottom 28 of the body 18. It will be appreciated that the propeller shaft could be coupled with suitable gearing such that the shaft rotates about a horizontal axis H-H by for example providing a 90 degree transmission subassembly 42.

In the gearing configuration shown, the propeller shaft 36 rotates in a clockwise direction. Alternatively, the direction of rotation could be reversed by suitable deployment of other reversing gears. Further, a "neutral" position could be provided when the transmission is shifted between clockwise and counter clockwise directions or vice-versa.

It will be appreciated that alternatives to the intermeshing gearing system described and depicted exist. Such alternatives include chain and sprocket mechanisms, transverse gear boxes (right hand dives and the like.

Examples of attached implements 40 that preferably are connected to the body 18 by a quick connect/disconnect subassembly include machines that perform chipping, trenching, brushing, pumping, and lifting operations.

One way of operating the disclosed apparatus involves these steps, not all of which need to be practiced, nor in the sequence set forth:

A. lowering the processor 12 and the pair of driving rollers 14 over the transmission device 10;
B. engaging the processor driving rollers 14 with the driven drive rollers 32, 33 so that in one embodiment each processor driving roller 14 engages two winch driven rollers;
C. attaching an implement 40 to the propeller shaft 36;
D. rotating the processor driving rollers 14 and the driven rollers 32, 33 to energize the attached implement 40.

In practice, the processor driving rollers 14 are preferably hydraulically driven. But they could also be driven by a diesel or other engine or by an electric motor.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

| Reference No. | Component |
| --- | --- |
| 10 | Transmission device |
| 12 | Processor energy source |
| 14 | Processor driving rollers |
| 18 | Body |
| 20 | Front face |
| 22 | Back face |
| 24 | Lateral sides |
| 26 | Top |
| 28 | Bottom |
| A-A | Imaginary vertical axis |
| 32 | Driven drive rollers |
| 36 | Propeller shaft |
| 38 | Shaft gear |
| 40 | Attached implement |
| 42 | 90° Transmission subassembly |
| 46 | Attached implement |
| 48 | Reverse gear |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission device coupled to a timber processor energy source having a plurality of processor driving rollers, the processor energy source providing energy to an attached implement through the transmission device, the transmission device comprising
  a body having a front face, a back face, lateral side faces, a top, a bottom, an imaginary horizontal axis extending between the lateral side faces, an imaginary vertical axis extending between the top and the bottom, the body being detachably attachable to the processor energy source;
  two pairs of driven rollers, each pair being driven by one of the processor driving rollers, the driven rollers being supported between the top and the bottom of the body so that they are rotatable about axes that are parallel to the vertical axis in response to the processor driving rollers;
  two reverse gears, each of the reverse gears being in communication with each pair of driven rollers, each reverse gear transferring rotational energy from the driven rollers;
  an idler roller in communication with one of the reverse gears; and
  a propeller shaft and associated propeller shaft gear, the propeller shaft gear rotating in unison with the idler roller and one of the reverse gears, the propeller shaft being supported by the body and extending between the top and bottom faces, the propeller shaft having an axis of rotation that is parallel to the vertical axis of the body and delivering rotational energy to the attached implement.

2. The transmission device of claim 1, wherein the plurality of processor driving rollers of the processor energy source includes only two processor driving rollers.

3. The transmission device of claim 1, wherein the two pairs of driven rollers comprise a first pair that rotate in a clockwise direction and a second pair that rotate in a counter clockwise direction.

4. The transmission device of claim 3, wherein the two pairs of driven rollers include two rollers mounted adjacent a lateral side face of the transmission device and two rollers mounted adjacent another lateral side face.

5. The transmission device of claim 4, wherein the reverse gears are mounted so that they rotate with two of the driven rollers in a plane that lies perpendicular to the vertical axis, the reverse gears intermeshing between rollers in each pair of driven rollers.

6. The transmission device of claim 5, wherein the propeller shaft extends from the body along an axis that lies in parallel with the vertical axis below the bottom of the body.

7. The transmission device of claim 5, wherein the propeller shaft rotates in a clockwise direction.

8. The transmission device of claim 1, wherein the attached implement is selected from the group consisting of machines that perform chipping, trenching, brushing, pumping, and lifting operations.

9. The transmission device of claim 1, wherein the propeller shaft rotates about a horizontal axis.

10. The transmission device of claim 9, further including a 90 degree drive mounted in the body.

11. A method for operating a transmission device, the transmission device being coupled to a movable processor having one or more driving processor rollers, the processor providing energy to the transmission device that delivers rotational energy to a propeller shaft and to an attached implement, the transmission device comprising:

a body having a front face, a back face, lateral side faces, a top, a bottom, an imaginary horizontal axis extending between the lateral side faces, an imaginary vertical axis extending between the top and the bottom, the body being detachably attachable to the processor energy source;

two pairs of driven rollers, each pair being driven by one of the processor driving rollers, the driven rollers being supported between the top and the bottom of the body so that they are rotatable about axes that are parallel to the vertical axis in response to the processor driving rollers;

two reverse gears, each of the reverse gears being in communication with each pair of driven rollers, each reverse gear transferring rotational energy from the driven rollers;

an idler roller in communication with one of the reverse gears; and a propeller shaft and associated propeller shaft gear, the propeller shaft gear rotating in unison with the idler roller and one of the reverse gears, the propeller shaft being supported by the body and extending between the top and bottom faces, the propeller shaft having an axis of rotation that is parallel to the vertical axis of the body and delivering rotational energy to the attached implement, the method including the steps of:

A. lowering the processor and the driving processor rollers over the transmission device;

B. engaging the driving processor rollers with the driven rollers so that each processor driving roller engages a pair of driven rollers;

C. securing the attached implement to the propeller shaft;

D. rotating the processor driving rollers and the driven rollers to deliver rotational force to the propeller shaft and the attached implement.

* * * * *